(12) United States Patent
Maeto (10) Patent No.: US 10,199,055 B1
(45) Date of Patent: Feb. 5, 2019

(54) MAGNETIC DISK DEVICE AND READ PROCESSING METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Nobuhiro Maeto, Yokohama (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/899,976

(22) Filed: Feb. 20, 2018

(30) Foreign Application Priority Data

Oct. 5, 2017 (JP) .................................. 2017-194967

(51) Int. Cl.
*G11B 20/10* (2006.01)
*G11B 5/012* (2006.01)

(52) U.S. Cl.
CPC .............. *G11B 5/012* (2013.01); *G11B 20/10* (2013.01)

(58) Field of Classification Search
CPC .......... G11B 20/10527; G11B 2220/90; G11B 5/012; G11B 5/09; G11B 2220/20; G11B 20/10009; G11B 20/10046; G11B 5/035; G11B 20/10027

USPC .......................... 360/32, 25, 31, 46, 65, 67
See application file for complete search history.

(56) References Cited

U.S. PATENT DOCUMENTS

| | | | | |
|---|---|---|---|---|
| 6,104,557 A | * | 8/2000 | Kasai | G11B 5/012 360/25 |
| 6,654,191 B2 | * | 11/2003 | Ottesen | G11B 5/012 360/25 |
| 6,724,550 B2 | * | 4/2004 | Lim | G11B 5/012 360/25 |
| 7,173,783 B1 | | 2/2007 | McEwen et al. | |
| 7,440,208 B1 | | 10/2008 | McEwen et al. | |
| 7,595,948 B1 | * | 9/2009 | Oberg | G11B 5/40 360/25 |
| 7,679,853 B2 | * | 3/2010 | Song | G11B 20/18 360/31 |
| 8,819,527 B2 | | 8/2014 | Xia et al. | |

* cited by examiner

*Primary Examiner* — Nabil Z Hindi
(74) *Attorney, Agent, or Firm* — White & Case LLP (57) ABSTRACT

According to one embodiment, a magnetic disk device including a disk, a head that writes data in the disk, and reads data from the disk, and a controller that generates second data of when first data is written in the disk based on the first data read from the disk, generates third data indicating change in an amplitude of the first data due to thermal fluctuation based on the second data, and adjusts the first data based on the third data.

18 Claims, 8 Drawing Sheets

MAGNETIC DISK DEVICE AND READ PROCESSING METHOD

CROSS-REFERENCE TO RELATED APPLICATIONS

This application is based upon and claims the benefit of priority from Japanese Patent Application No. 2017-194967, filed Oct. 5, 2017, the entire contents of which are incorporated herein by reference.

FIELD

Embodiments described herein relate generally to a magnetic disk device and a read processing method magnetic disk device.

BACKGROUND

In a magnetic disk device, size of a magnetic particle composing a recording layer of a disk has been micronized. In a magnetic disk device, as a magnetic particle is micronized, thermal stability decreases, and thermal fluctuation in which a magnetization direction of the magnetic particle freely inverts by thermal energy, may occur. When the magnetization direction of the magnetic particle has inverted due to the occurrence of the thermal fluctuation, the magnetic disk device may not correctly read data.

DETAILED DESCRIPTION

In general, according to one embodiment, a magnetic disk device comprises: a disk; a head that writes data in the disk, and reads data from the disk; and a controller that generates second data of when first data is written in the disk based on the first data read from the disk, generates third data indicating change in an amplitude of the first data due to thermal fluctuation based on the second data, and adjusts the first data based on the third data.

According to another embodiment, a read processing method that is applied to a magnetic disk device including a disk, and a head that writes data in the disk, and reads data from the disk, the method comprises: generating second data of when first data is written in the disk based on the first data read from the disk; generating third data indicating change in an amplitude of the first data due to thermal fluctuation based on the second data; and adjusting the first data based on the third data.

An embodiment will be described with reference to the drawings below. The drawings are examples and the scope of the invention is not limited thereto.

First Embodiment

Figure 1:
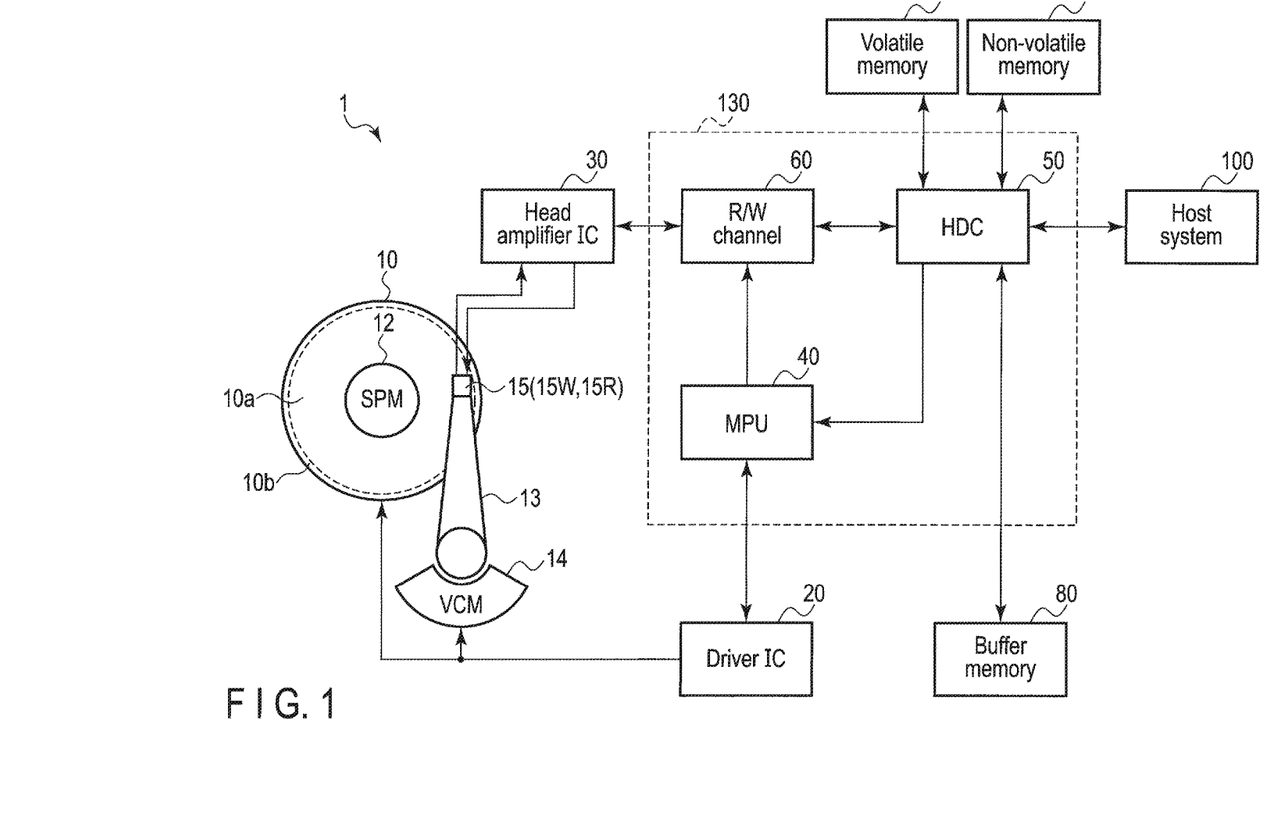
FIG. 1 is a block diagram showing a configuration of a magnetic disk device according to a first embodiment.

FIG. 1 is a block diagram showing a configuration of a magnetic disk device 1 according to a first embodiment.

The magnetic disk device 1 includes: a head disk assembly (HDA) described later; a driver IC 20; a head amplifier integrated circuit (hereinafter, head amplifier IC, or preamplifier) 30; a volatile memory 70; a buffer memory (buffer) 80; a non-volatile memory 90; and a system controller 130 that is an integrated circuit of one chip. The magnetic disk device 1 is connected to a host system (host) 100.

The HDA has: a magnetic disk (hereinafter, disk) 10; a spindle motor (SPM) 12; an arm 13 mounted with a head 15; and a voice coil motor (VCM) 14. The disk 10 rotates by the spindle motor 12. The arm 13 and the VCM 14 compose an actuator. The actuator controls the head 15 mounted in the arm 13 to move in a target position on the disk 10, by driving the VCM 14. The disk 10 and the head 15 may be provided by two or more. Hereinafter, data forwarded from the host 100 and written in the disk 10 is referred to as write data, and data read from the disk 10 and forwarded to the host 100 is referred to as read data. The read data and the write data are sometimes referred to simply as data.

The disk 10 is assigned with, in a recording region, a recording region 10a that is usable by a user, and a system area 10b in which information required for system management is written. The disk 10 is written with data by being magnetized by a recording magnetic field corresponding to a data pattern of the write data applied from a write head 15W of the head 15 described later. The disk 10 is magnetized in the same direction for every information region corresponding to a waveform (or a bit pattern) of the write data in each track. Therefore, a plurality of magnetic particles included in the information region are magnetized in the substantially same direction. Hereinafter, the plurality of magnetic particles included in the information region are sometimes referred to simply as an information region. For example, the information region corresponds to a waveform of nT (n=positive integer: 1, 2, 3, 4 . . . ) of the write data. In disk 10, as time elapses, a phenomenon (hereinafter, referred to as thermal fluctuation) in which a magnetization direction of the magnetic particle freely polarity inverts by thermal energy may occur. The thermal fluctuation appears conspicuously as the size (grain size) of the magnetic particle becomes smaller.

The head 15 includes the write head 15W and a read head 15R mounted to a slider, with the slider as a body. The write head 15W writes data in the disk 10. For example, the write head 15W writes the data in the disk 10 by applying to the disk 10 a recording magnetic field corresponding to the write data, to magnetize the disk 10. The read head 15R reads data recorded in a data truck in the disk 10. For example, the read head 15R reads the data from the disk 10 by detecting a direction of magnetization of each information region of the disk 10.

Figure 2:
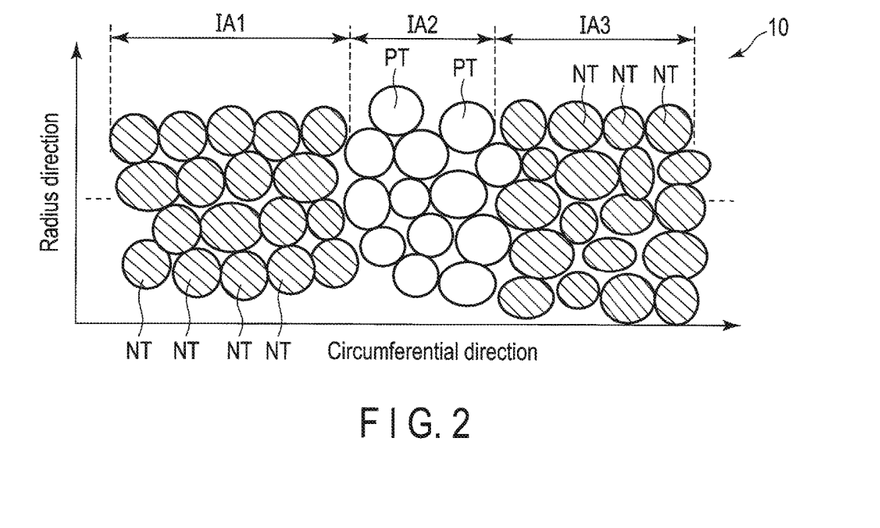
FIG. 2 is a schematic diagram for explaining an example of thermal fluctuation.
Figure 3:
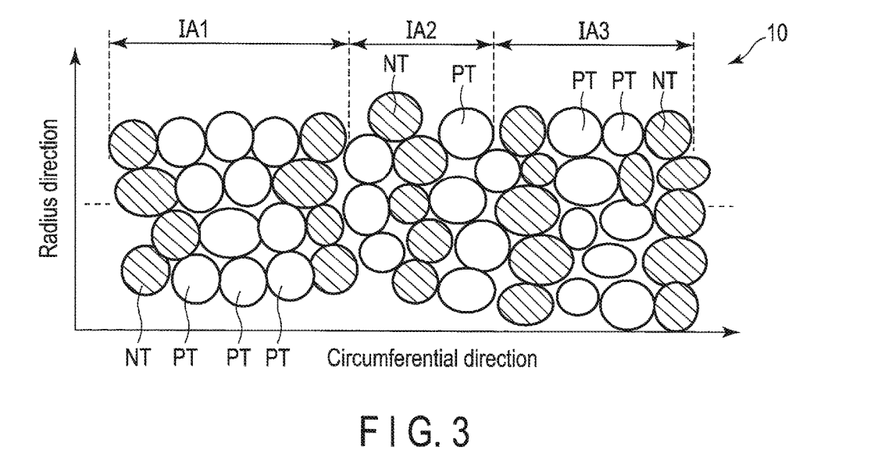
FIG. 3 is a schematic diagram for explaining an example of the thermal fluctuation.

FIGS. 2 and 3 are schematic diagrams for explaining an example of the thermal fluctuation. FIGS. 2 and 3 show a state of magnetization of a part of the disk 10. FIG. 2 shows a state of magnetization of a part of the disk 10 immediately after the write data is written. FIG. 3 shows a state of magnetization of a part of the disk 10 after a particular time has elapsed from FIG. 2. In FIGS. 2 and 3, a vertical axis represents a radius direction of the disk 10, and a horizontal axis represents a circumferential direction of the disk 10. In other words, the circumferential direction is a direction crossing vertically the radius direction. In FIGS. 2 and 3, the circumferential direction extends linearly, for convenience of explanation. However, the circumferential direction is curved, actually. FIGS. 2 and 3 show information regions IA1, IA2, and IA3. The information regions IA1, IA2, and IA3 are arranged continuously in the circumferential direction. In FIGS. 2 and 3, the information regions IA1, IA2, and IA3 have different widths of the circumferential direction. However, the information regions IA1, IA2, and IA3 may have the same width of the circumferential direction. In FIGS. 2 and 3, a solid oval shape or circle shape represents a magnetic particle PT magnetized in a positive direction, and a diagonal-lined oval shape or circle shape represents a magnetic particle NT magnetized in a negative direction. In FIGS. 2 and 3, the magnetic particles PT and NT are represented by the oval shape or the circle shape. However, the magnetic particles PT and NT may be a polygonal shape, and may be a shape other than the oval, circle and polygonal shape.

In FIG. 2, the information region IA1 is magnetized in the positive direction, the information region IA2 is magnetized in the negative direction, and the information region IA3 is magnetized in the positive direction. When time has elapsed, the magnetization direction of some magnetic particles of the information regions IA1, IA2, and IA3 inverts due to the thermal fluctuation. In the thermal fluctuation, the magnetization direction of the magnetic particle located in the inside in the width of the circumferential direction of the information regions IA1, IA2, and IA3 is easier to invert than the magnetization direction of the magnetic particle located in the outside in the width of the circumferential direction. For example, as shown in FIG. 3, the magnetization direction of the magnetic particle located in an intermediate part of the width of the information regions IA1, IA2, and IA3 inverts conspicuously, due to the thermal fluctuation.

Figure 4:
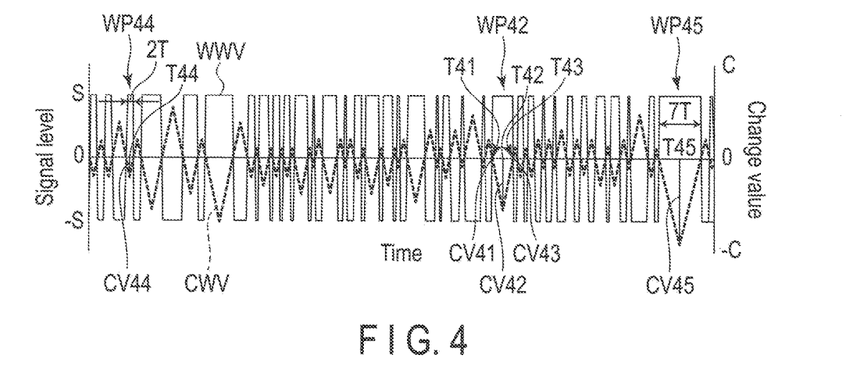
FIG. 4 is a diagram showing an example of change in amplitude of a read waveform of read data due to the thermal fluctuation.

FIG. 4 is a diagram showing an example of change in amplitude of a read waveform of read data due to the thermal fluctuation. FIG. 4 shows write data WWV that is to be written in the disk 10, and a data (hereinafter, referred to simply as change data) CWV showing the change of a change value (hereinafter, referred to simply as change value) of the amplitude of the read waveform that has changed due to the thermal fluctuation of the read data (hereinafter, referred to as read data corresponding to the write data WWV) obtained by reading of the write data WWV written in the disk 10. In FIG. 4, a horizontal axis represents time, and a vertical axis represents a signal level and a change value of the data WWV. In the vertical axis of the signal level of the data WWV, S represents a positive value, and –S represents a negative value. The absolute values of S and –S are the same. In the vertical axis of the change value, C represents a positive value, and –C represents a negative value. The absolute values of C and –C are the same.

In the example shown in FIG. 4, the change data CWV indicates that the absolute value of the amplitude of the read waveform of the read data corresponding to the write data WWV in which the thermal fluctuation has occurred, is smaller than the absolute value of the amplitude of the read waveform of the read data corresponding to the write data WWV in which the thermal fluctuation has not occurred. In the change data CWV, a change value corresponding to a timing in which the write data WWV is polarity inverted is almost 0. In the change data CWV, the absolute value of the change value becomes larger from the timing in which the write data WWV polarity inverts to the timing that is intermediate of an interval of the polarity inversion of the write data WWV. In an example, in the change data CWV, change value CV41, CV43 corresponding to timings T41, T43 in which a waveform WP42 polarity inverts are 0. In the change data CWV, the absolute value of the change value becomes larger from the timings T41, T43 in which the waveform WP42 polarity inverts to the timing T42 that is an intermediate of an interval of the polarity inversion of the waveform WP42.

In the example shown in FIG. 4, in the write data WWV, the absolute value of the change value corresponding to the intermediate timing of the interval of the polarity inversion of the waveform having a small frequency is larger than the absolute value of the change value corresponding to the intermediate timing of the interval of the polarity inversion of the waveform having a large frequency. In an example, a change value CV45 corresponding to an intermediate timing T45 of the interval of the polarity inversion of a WP45 of 7T is larger than a change value CV44 corresponding to an intermediate timing T44 of the interval of the polarity inversion of a waveform WP44 of 2T that has larger frequency than that of the waveform WP45.

In this way, the change data of the amplitude of the read waveform of the read data due to the thermal fluctuation has the feature as shown in FIG. 4. This feature is due to the property of the thermal fluctuation shown in FIG. 3.

Figure 5:
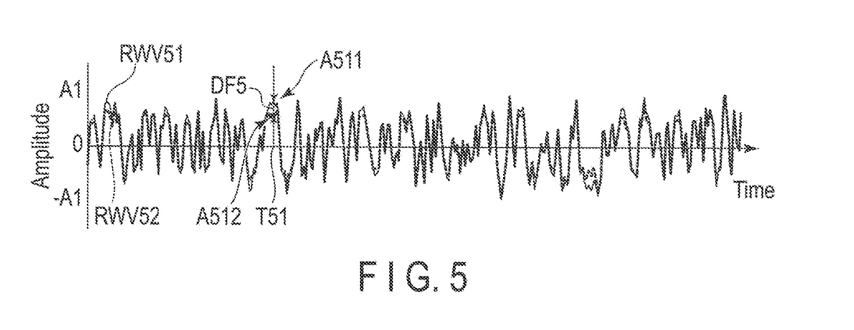
FIG. 5 is a diagram showing an example of the read waveform of the read data of when the thermal fluctuation occurs.

FIG. 5 is a diagram showing an example of the read waveform of the read data when the thermal fluctuation occurs. FIG. 5 shows a read waveform (hereinafter, referred to as a reference waveform) RWV51 of the read data read before the thermal fluctuation occurs, and a read waveform (hereinafter, referred to as a thermal fluctuation waveform) RWV52 of the read data read after the thermal fluctuation occurs. In other words, the reference waveform is a read waveform that has not been influenced by the thermal fluctuation. In FIG. 5, a horizontal axis represents time, and a vertical axis represents an amplitude of the read waveform. In the vertical axis, A1 represents a positive value, and –A1 represents a negative value. The absolute values of A1 and –A1 are the same. In FIG. 5, the RWV51 is, for example, a read waveform of the read data obtained by reading of the write data WWV of FIG. 4 written in the disk 10. The read waveform RWV52 corresponds to a read waveform of when the thermal fluctuation occurs in the read data of the read waveform RWV51. In the example shown in FIG. 5, when the reference waveform RWV51 and the thermal fluctuation waveform RWV52 are compared, the absolute value of the amplitude of a part of the thermal fluctuation waveform RWV52 is smaller than the absolute value of the amplitude of a part of the reference waveform RWV51.

Data indicating the change of a difference value between the reference waveform RWV51 and the thermal fluctuation waveform RWV52 (hereinafter, referred to simply as a difference value) can be calculated based on the change data described above. Accordingly, a difference value of a particular timing of the change data can be calculated based on the change value of the read waveform due to the thermal fluctuation in the timing. In an example, a difference value DF5 between an amplitude A511 of a timing T51 of the reference waveform RWV51 and an amplitude A512 of the timing T51 of the thermal fluctuation waveform RWV52 can be calculated based on a change value corresponding to the timing T51 of the reference waveform RWV51. Particularly, the difference value DF5 can be calculated by convolving the change value corresponding to the timing T51 of the reference waveform RWV51 as a saturation level (or amplitude level) of an isolated read waveform. For example, the timing T51 corresponds to the intermediate timing of the interval of the polarity inversion of the waveform of the write data WWV to which the waveform of the amplitude A511 corresponds. In this way, the thermal fluctuation waveform can be calculated based on the reference waveform and the difference data. In other words, the reference waveform can be calculated based on the difference data and the thermal fluctuation waveform. That is, the reference waveform can be calculated by using the difference value to adjust the thermal fluctuation waveform.

A driver IC 20 controls driving of the SPM 12 and the VCM 14 according to control by the system controller 130 (specifically, an MPU 30 described later).

The head amplifier IC 30 includes a read amplifier and a write driver. The read amplifier amplifies a read signal read from the disk 10, and outputs the read signal to the system controller 130 (specifically, a read/write (R/W) channel 60 described later). The write driver outputs a write current according to the write data output from the R/W channel 60, to the head 15.

The volatile memory 70 is a semiconductor memory in which data saved is lost when a power supply is interrupted. The volatile memory 70 stores data required for processing by each unit in the magnetic disk device 1, and the like. The volatile memory 70 is, for example, a dynamic random access memory (DRAM), or a synchronous dynamic random access memory (SDRAM).

The buffer memory 80 is a semiconductor memory that temporarily stores data transmitted and received between the magnetic disk device 1 and the host 100, and the like. The buffer memory 80 may be configured integrally with the volatile memory 70. The buffer memory 80 is, for example, the DRAM, a static random access memory (SRAM), the SDRAM, a ferroelectric random access memory (FeRAM), or a magnetoresistive random access memory (MRAM).

The non-volatile memory 90 is a semiconductor memory that stores data saved even when a power supply is interrupted. The non-volatile memory 90 is, for example, a flash read only memory (ROM) (FROM) of an NOR type or an NAND type.

The system controller (controller) 130 is, for example, realized by using a large-scale integration (LSI) called a System-on-a-Chip (SoC) in which a plurality of elements are integrated in a single chip. The system controller 130 includes a microprocessor (MPU) 40, a hard disk controller (HDC) 50, and the read/write (R/W) channel 60. The system controller 130 is electrically connected to the driver IC 20, the head amplifier IC 30, the volatile memory 70, the buffer memory 80, the non-volatile memory 90, and the host system 100.

The MPU 40 is a main controller that controls each unit of the magnetic disk device 1. The MPU 40 performs servo control for controlling the VCM 14 via the driver IC 20 and positioning the head 15. The MPU 40 controls write operation of data to the disk 10, and selects a destination to save of the write data forwarded from the host 100. The MPU 40 performs processing based on firmware. The MPU 40 is connected to each unit of the magnetic disk device 1. For example, the MPU 40 is electrically connected to the HDC 50 and the R/W channel 60, and controls processing thereof.

The HDC 50 controls data forwarding between the host 100 and the R/W channel 60 according to an instruction from the MPU 40. The HDC 50 is electrically connected to the MPU 40, the R/W channel 60, the volatile memory 70, the buffer memory 80, the non-volatile memory 90, and the host system 100.

The R/W channel 60 performs signal processing of the read data and the write data according to the instruction from the MPU 40. The R/W channel 60 has a circuit or a function for measuring a signal quality of the read data read from the disk 10. The R/W channel 60 is electrically connected to the head amplifier IC 30, the MPU 40, and the HDC 50.

Hereinafter, a system that forwards the read data read from the disk 10 to the host 100, in the head 15, the head amplifier IC 30, and the controller 130, is referred to as a read system.

Figure 6:
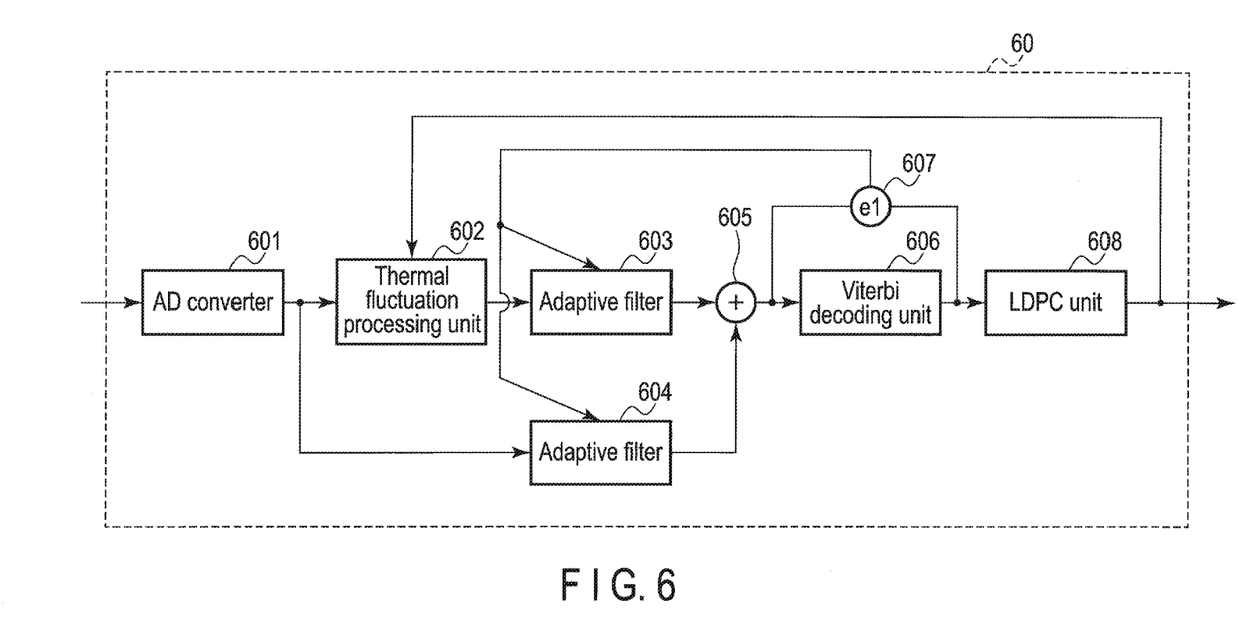
FIG. 6 is a block diagram showing a configuration example of a read system of an R/W channel according to the first embodiment.

FIG. 6 is a block diagram showing a configuration example of a read system of the R/W channel 60 according to the first embodiment.

The R/W channel 60 includes an AD converter 601, a thermal fluctuation processing unit 602, adaptive filters 603, 604, a synthesis unit 605, a Viterbi decoding unit 606, a comparing unit 607, and a low density parity check (LDPC) unit 608.

The AD converter 601 converts the read data input from the head amplifier IC 30, and outputs the converted data to the thermal fluctuation processing unit 602 and the adaptive filter 604. For example, the AD converter 601 is an analogue-digital (AD) converter that converts analogue data input from the head amplifier IC 30 to digital data.

The thermal fluctuation processing unit 602 generates adjustment data for adjusting the thermal waveform of the read data input from the AD converter 601 to the reference waveform, or a waveform that is approximated to the reference waveform, and output the generated adjustment data to the adaptive filter 603. The adjustment data is data indicating the change of an adjustment value for adjusting the amplitude of the thermal fluctuation waveform to the reference waveform, or the waveform that is approximated to the reference waveform, in each timing. That is, the adjustment value corresponds to the difference value described above. For example, first, the thermal fluctuation processing unit 602 generates data (hereinafter, referred to as prediction data) corresponding to the write data of when the read data is written in the disk 10, from the read data in which the thermal fluctuation has occurred, input from the AD converter 601. Next, the thermal fluctuation processing unit 602 generates data (hereinafter, referred to as estimation data) in which the change data described above is estimated based on the prediction data. Hereinafter, the estimation data is sometimes referred to as the change data. The thermal fluctuation processing unit 602 generates the adjustment data based on the estimation data to output the adjustment data to the adaptive filter 603. In an example, the thermal fluctuation processing unit 602 generates the adjustment data by performing convolving processing to the prediction data corresponding to the intermediate timing of the interval of the polarity inversion of the prediction data, as a saturation level of the isolated read waveform, to output the adjustment data to the adaptive filter 603. Detail of the thermal fluctuation processing unit 602 will be described later.

The adaptive filter 603 equalizes the waveform of the adjustment data input from the thermal fluctuation processing unit 602, to output the equalized waveform to the synthesis unit 605. The adaptive filter 603 is, for example, a finite impulse response (FIR) filter. The adaptive filter 603 optimizes a filter coefficient, for example, the tap number, used in equalization of the waveform of the adjustment data, by least mean square (LMS) algorithm. For example, the adaptive filter 603 adjusts the tap number so that the signal from the comparing unit 607 described later is the minimum.

The adaptive filter 604 equalizes the read waveform of the read data input from the AD converter 601, to output the equalized read waveform to the synthesis unit 605. The adaptive filter 604 is, for example, an FIR filter. The adaptive filter 604 optimizes a filter coefficient, for example, the tap number, used in equalization of the waveform of the read data, by the LMS algorithm. For example, the adaptive filter 604 adjusts the tap number so that the signal from the comparing unit 607 described later is the minimum.

The synthesis unit 605 synthesizes the adjustment data input from the adaptive filter 603 and the read data input from the adaptive filter 604, to output the synthesized data (hereinafter, referred to as corrected data) to the Viterbi decoding unit 606 and the comparing unit 607. That is, the corrected data is the read data of which the influence by the thermal fluctuation is reduced. For example, the synthesis unit 605 generates the corrected data by adding the adjustment data input from the FIR filter 603 to the thermal fluctuation waveform of the read data input from the adaptive filter 604, to output the generated corrected data to the Viterbi decoding unit 606 and the comparing unit 607.

The Viterbi decoding unit 606 performs Viterbi decoding processing to the corrected data input from the synthesis unit 605, to output the corrected data performed with the Viterbi decoding processing to the LDPC unit 608. The Viterbi decoding unit 606 outputs reconstruction data that is obtained by performing reconstruction processing to the corrected data performed with the Viterbi decoding processing, to the comparing unit 607.

The comparing unit 607 calculates an error e1 between the corrected data input from the synthesis unit 605 and the reconstruction data input from the Viterbi decoding unit 606, to output the calculated error e1 to the adaptive filter 603 and the adaptive filter 604. For example, the error e1 is a mean square error.

The LDPC unit 608 performs LDPC decoding processing to the corrected data input from the Viterbi decoding unit 606, to output the corrected data performed with the LDPC decoding processing to the HDC 50. The LDPC unit 608 outputs information indicating whether the corrected data is determined to be an error in an LDPC checking determinant in the LDPC decoding processing to the thermal fluctuation processing unit 602.

Figure 7:
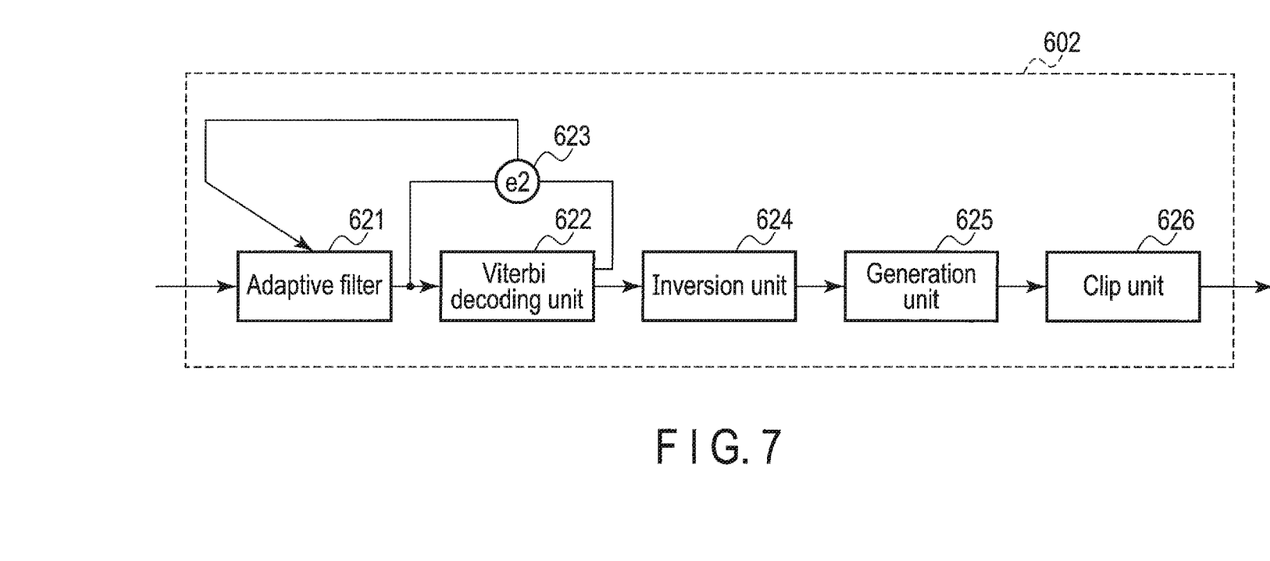
FIG. 7 is a block diagram showing a configuration example of a thermal fluctuation processing unit according to the first embodiment.

FIG. 7 is a block diagram showing a configuration example of a thermal fluctuation processing unit 602 according to the first embodiment.

The thermal fluctuation processing unit 602 includes an adaptive filter 621, a Viterbi decoding unit 622, a comparing unit 623, an inversion unit 624, a generation unit 625, and a clip unit 626. By these components, the thermal fluctuation processing unit 602 can improve adjustment accuracy of the change in the read data due to the thermal fluctuation.

The adaptive filter 621 equalizes the waveform of the read data input from the AD converter 601, to output the equalized waveform to the Viterbi decoding unit 622. The adaptive filter 621 is, for example, an FIR filter. The adaptive filter 621 optimizes a filter coefficient, for example, the tap number, used in equalization of the read waveform of the read data, by the LMS algorithm. For example, the adaptive filter 621 adjusts the tap number so that the signal from the comparing unit 623 described later is the minimum.

The Viterbi decoding unit 622 performs Viterbi decoding processing to the read data input from the adaptive filter 621, and generates the prediction data and reliability information, for example, a log likelihood ratio (LLR), to output the generated prediction data and the reliability information to the inversion unit 624. For example, the Viterbi decoding unit 622 performs hard decision processing to the read data input from the adaptive filter 621, and generates the prediction data and reliability information indicated by 1 and 0 series, to output the generated prediction data and the reliability information to the inversion unit 624. The Viterbi decoding unit 622 outputs the reconstruction data obtained by performing reconstruction processing to the generated prediction data, to the comparing unit 623.

The comparing unit 623 calculates an error e2 between the read data input from the adaptive filter 621 and the reconstruction data input from the Viterbi decoding unit 622, to output the calculated error e2 to the adaptive filter 621. For example, the error e2 is a mean square error.

The inversion unit 624 receives an input of the prediction data and the reliability information of this prediction data from the Viterbi decoding unit 622, and polarity inverts a bit pattern having low reliability of the prediction data based on the reliability information input, and outputs the prediction data in which the bit pattern having low reliability has been polarity inverted, to the generation unit 625. The bit pattern having low reliability is a bit pattern having high possibility of having an error generated, and is, for example, a bit pattern (hereinafter, referred to as a high frequency pattern) forming a waveform of high frequency located between bit patterns (hereinafter, referred to as a low frequency pattern) forming two waveforms having a low frequency. The high frequency pattern is, for example, a bit pattern of 1T. The low frequency pattern is, a high frequency pattern, for example, a bit pattern of a waveform having lower frequency than that of 1T.

Figure 8:
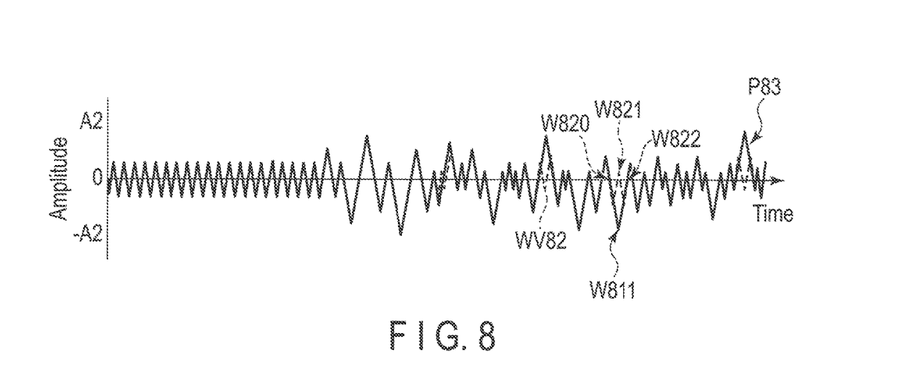
FIG. 8 is a diagram for explaining an example of processing of an inversion unit according to the first embodiment.

FIG. 8 is a diagram for explaining an example of processing of the inversion unit 624 according to the present embodiment. FIG. 8 shows, for example, an example of the read waveform of the prediction data output from the Viterbi decoding unit 622. FIG. 8 shows a thermal fluctuation waveform WV81 including no error due to the Viterbi decoding processing, and a thermal fluctuation waveform WV82 including an error due to the Viterbi decoding processing. In FIG. 8, a vertical axis represents an amplitude of the read waveform, and a horizontal axis represents time. In the vertical axis, A2 represents a positive value, and −A2 represents a negative value. The absolute values of A2 and −A2 are the same. In FIG. 8, the thermal fluctuation waveform WV82 is a read waveform of when an error due to the Viterbi decoding processing is generated in the thermal fluctuation waveform WV81. The thermal fluctuation waveform WV81 and the thermal fluctuation waveform WV82 are the almost same waveform. However, a part of them is different. In an example, a waveform W811 of the thermal fluctuation waveform WV81 and waveforms W820, W821, and W822 of the thermal fluctuation waveform WV82 corresponding to the waveform W811 are different. The waveform W821 that is polarity inverted, and the waveforms W820 and W822 are the same as the waveform W811. In the thermal fluctuation waveform WV82, the waveform W821 is the waveform having a high frequency, for example, 1T, and the waveform W820 and the waveform W822 are the waveforms having lower frequency than that of the waveform W821, for example, 4T.

In the example shown in FIG. 8, the inversion unit 624 detects a high frequency pattern, for example, a bit pattern of the waveform W821 of 1T, from the prediction data input from the Viterbi decoding unit 622. For example, the inversion unit 624 acquires information of a run length of the bit pattern of the waveform W821, to determine whether the bit pattern of the waveform W821 is the high frequency pattern. The inversion unit 624 acquires information of the run length of the bit pattern of the waveform 820 that is immediately before the detected bit pattern of the waveform W821 and the bit pattern of the waveform W822 that is immediately after the bit pattern of the waveform W821, to determine whether the bit pattern of the waveform W821 is to be a target of the polarity inversion. For example, the inversion unit 624 sets the bit pattern of the waveform W821 to be the target of the polarity inversion when the run length of the bit pattern of the waveform 820 and the bit pattern of the waveform W822 is longer than the run length of the bit pattern of the waveform W821. In other words, the inversion unit 624 sets the bit pattern of the waveform W821 having a high frequency to be the target of the polarity inversion when there is the bit pattern of the waveform 820 and the waveform 822 having a low frequency in immediately before and after the bit pattern of the waveform W821 having a high frequency. The inversion unit 624 may set the bit pattern of the waveform W821 to be the target of the polarity inversion when the run length of the bit pattern of the waveform 820 and the waveform W822 is larger than a particular run length. In other words, the inversion unit 624 may set the bit pattern of the waveform W821 to be the target of the polarity inversion when the bit pattern of the waveform 820 and the bit pattern of the waveform 822 are low frequency patterns having a particular run length or more. When determining that the bit pattern of the waveform W821 is to be the target of the polarity inversion, the inversion unit 624 determines whether the reliability information of the bit pattern of the waveform W821 is lower than a threshold (hereinafter, referred to as a first threshold), or is the first threshold or less. The first threshold is a specific value indicating correctness of the bit pattern, and is, for example, specific likelihood. When determining that the bit pattern is lower than the first threshold, the inversion unit 624 polarity inverts the bit pattern of the waveform W821. The inversion unit 624 repeatedly performs polarity inversion processing described above to the bit pattern having low reliability of the prediction data, for example, a small log likelihood ratio, to output the prediction data performed with the polarity inversion processing to the generation unit 625. The inversion unit 624 may hold the first threshold, and may acquire the first threshold from a memory, for example, the non-volatile memory 90. The inversion unit 624 acquires information from the LDPC unit 608, indicating whether the bit pattern of the corrected data corresponding to the bit pattern of the waveform W821 is determined to be an error by the LDPC checking determinant, to determine whether the bit pattern of the corrected data corresponding to the bit pattern of the waveform W821 is determined to be and error by the checking determinant of the LDPC. When determining that the bit pattern is determined to be an error, the inversion unit 624 limits processing of polarity inverting the bit pattern having low reliability of the prediction data, for example, a small log likelihood ratio.

The generation unit 625 generates the estimation data based on the prediction data input from the inversion unit 624, and generates the adjustment data based on the generated estimation data, to output the generated adjustment data to the clip unit 626. In an example, the generation unit 625 generates the estimation data based on a formula representing the feature of the change data (estimation data) shown in FIG. 4, and the prediction data. That is, the generation unit 625 generates the estimation data based on a formula representing the feature that the absolute value of the estimation data increases from the timing in which the polarity inversion is performed of the prediction data, to the intermediate timing of the interval of the polarity inversion of the prediction data, and that the estimation data of the intermediate timing of the interval of the polarity inversion of the waveform having a smaller frequency (second frequency) than the first frequency of the prediction data is larger than the estimation data of the intermediate timing of the interval of the polarity inversion of the waveform of the specified frequency (first frequency) of the prediction data, and based on the prediction data. The generation unit 625 generates the adjustment data by performing convolving processing to the estimation data corresponding to the intermediate timing of the interval of the polarity inversion of the prediction data, as a saturation level of the isolated read waveform, to output the adjustment data to the clip unit 626. The generation unit 625 can change a range of waveform interference to which convolving is performed when performing the convolving processing.

The clip unit 626 determines whether the adjustment data input from the generation unit 625 is larger than a threshold (hereinafter, referred to as a second threshold), or is the second threshold or less. When determining that the adjustment data is larger than the second threshold, the clip unit 626 clips the adjustment data, to output the clipped adjustment data to the adaptive filter 603. The second threshold is, for example, a specific amplitude. The clip unit 626 may hold the second threshold, and may acquire the second threshold from a memory, for example, the non-volatile memory 90. For example, when determining that the amplitude of the particular waveform of the adjustment data is larger than the second threshold, the clip unit 626 clips the amplitude of the particular waveform of the adjustment data into the second threshold, to output the adjustment data in which the amplitude of the particular waveform is clipped, to the adaptive filter 603.

Figure 9:
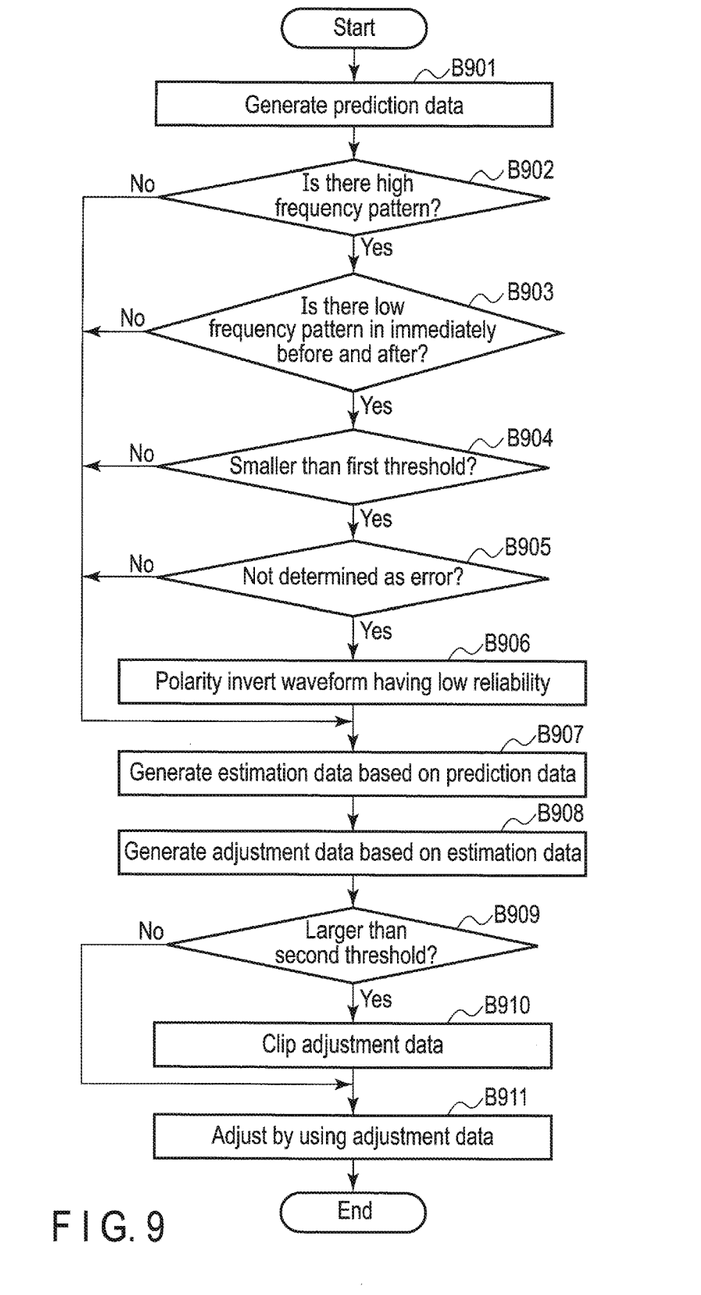
FIG. 9 is a flowchart showing an example of the thermal fluctuation processing according to the first embodiment.

FIG. 9 is a flowchart showing an example of the thermal fluctuation processing according to the present embodiment.

The controller 130 generates the prediction data based on the read data in which the thermal fluctuation has occurred (B901). The controller 130 determines whether there is a high frequency pattern (a bit pattern of the waveform having a high frequency), for example, a data pattern of 1T, in the prediction data (B902). When determining that there is no high frequency pattern (NO at B902), the controller 130 proceeds to processing at B907. When determining that there is a high frequency pattern (YES at B902), the controller 130 determines whether there is a low frequency pattern (a bit pattern of the waveform having a low frequency) in immediately before and after the high frequency pattern (B903). For example, the controller 130 acquires information on the run length of the bit pattern of the waveform of immediately before the high frequency pattern, and information on the run length of the bit pattern of the waveform of immediately after the high frequency pattern, to determine whether the bit pattern of the waveform of immediately before and after the high frequency pattern is a low frequency pattern. When determining that there is no low frequency pattern (NO at B903), the controller 130 proceeds to processing at B907. When determining that there is a low frequency pattern (there is a bit pattern of the waveform having a low frequency) (YES at B903), the controller 130 determines whether the reliability information of the high frequency pattern, for example, the log likelihood ratio is smaller than the first threshold, or is the first threshold or more (B904). When determining that the reliability information of the high frequency pattern is the first threshold or more, (NO at B904), the controller 130 proceeds to processing at B907. When determining that the reliability information of the high frequency pattern is smaller than the first threshold (YES at B904), the controller 130 determines whether the bit pattern of the corrected data corresponding to the high frequency pattern is determined as an error by the checking determinant of the LDPC in the LDPC unit 608 (B905). For example, in the LDPC unit 608, the controller 130 determines whether the bit pattern of the corrected data corresponding to the high frequency pattern that has polarity inverted one step before is determined as an error by the checking determinant of the LDPC. When determining that the bit pattern is determined as an error (NO at B905), the controller 130 proceeds to processing at B907. When determining that the bit pattern is not determined as an error (YES at B905), the controller 130 polarity inverts the bit pattern of the waveform having a high frequency having low reliability of the prediction data (B906). The controller 130 generates the estimation data based on the prediction data (B907). The controller 130 generates the adjustment data based on the generated estimation data (B908). The controller 130 determines whether the particular waveform of the adjustment data is larger than the second threshold, or is the second threshold or less (B909). When determining that the particular waveform is the second threshold or less (NO at B909), the controller 130 proceeds to processing at B910. When determining that the particular waveform is larger than the second threshold (YES at B909), the controller 130 clips so that the particular waveform of the adjustment data becomes the second threshold (B910). The controller 130 adjusts the thermal fluctuation waveform of the read data by using the generated adjustment data (B911) and ends the processing.

Figure 10:
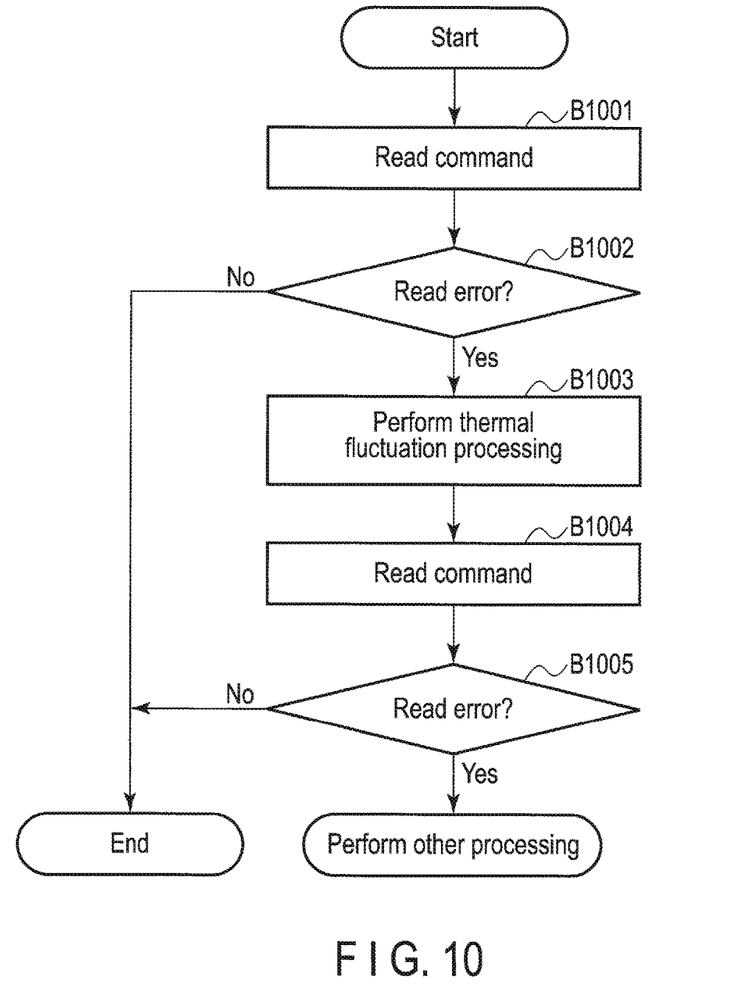
FIG. 10 is a flowchart showing an example of a timing in which the thermal fluctuation processing is performed, according to the first embodiment.

FIG. 10 is a flowchart showing an example of a timing in which the thermal fluctuation processing is performed, according to the present embodiment.

The controller 130 receives a read command from the host 100 (B1001). The controller 130 determines whether a read error is generated (B1002). When determining that a read error is not generated (NO at B1002), the controller 130 ends the processing. When determining that the read error is generated (YES at B1002), the controller 130 performs the thermal fluctuation processing by the thermal fluctuation processing 602 described above, or the like (B1003). The controller 130 receives a read command from the host 100 (B1004). The controller 130 determines whether a read error is generated (B1005). When determining that a read error is not generated (NO at B1005), the controller 130 ends the processing. When determining that a read error is generated (YES at B1005), the controller 130 performs other processing. Other processing is, for example, refresh processing for rewriting data written in the disk 10 in the same position of the disk 10.

According to the present embodiment, the magnetic disk device 1 has the thermal fluctuation processing unit 602. The magnetic disk device 1 generates the prediction data based on the read data in which the thermal fluctuation has occurred, read from the disk 10 by the thermal fluctuation processing unit 602. The magnetic disk device 1 generates the estimation data based on the prediction data, and generates the adjustment data based on the estimation data. The magnetic disk device 1 can generate read data in which the thermal fluctuation has not occurred, or data that is close to read data in which the thermal fluctuation has not occurred, from read data in which thermal fluctuation has occurred, by using the adjustment data. That is, the magnetic disk device 1 can adjust read data by using the adjustment data generated by the thermal fluctuation processing unit 602, to alleviate or remove the influence of the thermal fluctuation occurred in the read data. Thus, the magnetic disk device 1 has improved reliability of data read.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head that writes data in the disk, and reads data from the disk; and
a controller that performs hard decision processing to first data having a first read waveform which is read from the disk in which thermal fluctuation has occurred and predicts a second read waveform of the first data which is read from the disk in which the thermal fluctuation has not occurred, generates second data indicating a change in an amplitude of the first read waveform due to the thermal fluctuation based on the second read waveform, and adjusts the first read waveform to reduce an influence of the thermal fluctuation based on the second data.

2. The magnetic disk device according to claim 1, wherein the controller generates the second data based on a feature that the second data becomes larger from a first timing and a second timing in which the second read waveform polarity inverts, to a third timing being an intermediate of an interval of the polarity inversion of the second read waveform, and that the second data of a fifth timing being an intermediate of the interval of the polarity inversion of a waveform having a second frequency being smaller than a first frequency of the second read waveform, is larger than the second data of a fourth timing being an intermediate of the interval of the polarity inversion of the waveform having the first frequency of the second read waveform, and based on the second read waveform.

3. The magnetic disk device according to claim 1, wherein the controller, when detecting a first bit pattern having low reliability, in the second read waveform, polarity inverts the first bit pattern.

4. The magnetic disk device according to claim 3, wherein the controller detects the first bit pattern that is a high frequency pattern, in the second read waveform, determines whether a second bit pattern immediately before the first bit pattern and a third bit pattern immediately after the first bit pattern are low frequency patterns or high frequency patterns, in the second read waveform, and when determining that the second bit pattern and the third bit pattern are the low frequency patterns, determines whether first information indicating reliability of the first bit pattern is lower than a first threshold, or is the first threshold or more, and when determining that the first information is lower than the first threshold, polarity inverts the first bit pattern.

5. The magnetic disk device according to claim 4, wherein the controller acquires a first run length of the first bit pattern, a second run length of the second bit pattern, and a third run length of the third bit pattern, and when the second run length and the third length are longer than the first run length, sets the first bit pattern to be a target of polarity inversion.

6. The magnetic disk device according to claim 5, wherein the controller determines whether a fourth bit pattern corresponding to the first bit pattern that has polarity inverted is determined as an error by an LDPC checking determinant, and when determining that the fourth bit pattern is determined to be an error, limits processing of polarity inverting a bit pattern having low reliability.

7. The magnetic disk device according to claim 1, wherein the controller performs convolving processing of the second data as a saturation level of an isolated read waveform to generate third data, and adjusts the first read waveform by using the third data.

8. The magnetic disk device according to claim 7, wherein the controller can change a range of waveform interference to which the convolving is performed when performing the convolving processing.

9. The magnetic disk device according to claim 7, wherein the controller determines whether a first amplitude of a first waveform of the third data is larger or smaller than a second threshold, and when determining that the first amplitude is larger than the second threshold, decreases the first amplitude to the second threshold.

10. A read processing method that is applied to a magnetic disk device including a disk, and a head that writes data in the disk, and reads data from the disk, the method comprising:
performing hard decision processing to first data having a first read waveform which is read from the disk in which thermal fluctuation has occurred and predicting a second read waveform of the first data which is read from the disk in which the thermal fluctuation has not occurred;
generating second data indicating a change in an amplitude of the first read waveform due to the thermal fluctuation based on the second read waveform; and
adjusting the first read waveform to reduce an influence of the thermal fluctuation based on the second data.

11. The read processing method according to claim 10, further comprising:
generating the second data based on a feature that the second data becomes larger from a first timing and a second timing in which the second read waveform polarity inverts, to a third timing being an intermediate of an interval of the polarity inversion of the second read waveform, and that the second data of a fifth timing being an intermediate of the interval of the polarity inversion of a waveform having a second frequency being smaller than a first frequency of the second read waveform, is larger than the second data of a fourth timing being an intermediate of the interval of the polarity inversion of the waveform having the first frequency of the second read waveform, and based on the second read waveform.

12. The read processing method according to claim 10, further comprising:
when detecting a first bit pattern having low reliability, in the second read waveform, polarity inverting the first bit pattern.

13. The read processing method according to claim 12, further comprising:
detecting the first bit pattern that is a high frequency pattern, in the second read waveform, determining whether a second bit pattern immediately before the first bit pattern and a third bit pattern immediately after the first bit pattern are low frequency patterns or high frequency patterns, in the second read waveform, and when determining that the second bit pattern and the third bit pattern are the low frequency patterns, determining whether first information indicating reliability of the first bit pattern is lower than a first threshold, or is the first threshold or more, and when determining that the first information is lower than the first threshold, polarity inverting the first bit pattern.

14. The read processing method according to claim 13, further comprising:
acquiring a first run length of the first bit pattern, a second run length of the second bit pattern, and a third run length of the third bit pattern, and when the second run length and the third run length are longer than the first run length, setting the first bit pattern to be a target of polarity inversion.

15. The read processing method according to claim 14, further comprising:
determining whether a fourth bit pattern corresponding to the first bit pattern that has polarity inverted is determined as an error by an LDPC checking determinant, and when determining that the fourth bit pattern is determined to be an error, limiting processing of polarity inverting a bit pattern having low reliability.

16. The read processing method according to claim 10, further comprising:
performing convolving processing of the second data as a saturation level of an isolated read waveform to generate third data, and adjusting the first read waveform by using the third data.

17. The read processing method according to claim 16, wherein:
a range of waveform interference to which the convolving is performed when performing the convolving processing can be changed.

18. The read processing method according to claim 16, further comprising:
determining whether a first amplitude of a first waveform of the third data is larger or smaller than a second threshold, and when determining that the first amplitude is larger than the second threshold, decreasing the first amplitude to the second threshold.

* * * * *